United States Patent
Barbas et al.

(10) Patent No.: US 10,678,775 B2
(45) Date of Patent: Jun. 9, 2020

(54) DETERMINING INTEGRITY OF DATABASE WORKLOAD TRANSACTIONS

(71) Applicant: International Business Machines Corporation, Armonk, NY (US)

(72) Inventors: Pedro M. Barbas, Dunboyne (IE); Paddy Burke, Kilcullen (IE); Gary F. Murtagh, Dublin (IE); David M. Tilson, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 15/385,235

(22) Filed: Dec. 20, 2016

(65) Prior Publication Data

US 2018/0173744 A1   Jun. 21, 2018

(51) Int. Cl.
*G06F 16/00*    (2019.01)
*G06F 16/23*    (2019.01)

(52) U.S. Cl.
CPC ...... *G06F 16/2365* (2019.01); *G06F 16/2343* (2019.01)

(58) Field of Classification Search
CPC .................................................. G06F 16/2365
USPC ................................................. 707/703, 639
See application file for complete search history.

(56) References Cited

U.S. PATENT DOCUMENTS 6,304,882 B1 * 10/2001 Strellis ................ G06F 11/2064
6,393,419 B1 *  5/2002 Novak ................. G06Q 10/087

2004/0111422 A1 *  6/2004 Devarakonda ........ G06F 9/526
2008/0270407 A1    10/2008 Desai et al.
2011/0153566 A1     6/2011 Larson et al.
2011/0302143 A1    12/2011 Lomet
(Continued)

FOREIGN PATENT DOCUMENTS

EP      3026581 A1   6/2016
WO      0046698 A1   8/2000

OTHER PUBLICATIONS

Kaur et al., "Concurrency Control in Distributed Database Systems", International Journal of Advanced Research in Computer Science and Software Engineering, vol. 3, Issue 7, Jul. 2013, pp. 1443-1447.
(Continued)

*Primary Examiner* — Chelcie L Daye
(74) *Attorney, Agent, or Firm* — Robert Bunker; Edell, Shapiro & Finnan, LLC

(57) ABSTRACT

Evaluating integrity of database workloads includes receiving transactional database lock commands from concurrent users and identifying a usage pattern of lock actions when results of an execution of the transactional database lock commands match a usage pattern for a data integrity rule. The data integrity rule is added to a set of one or more data integrity rules for the transactional database lock commands. The transactional database lock commands and the set of one or more data integrity rules are forwarded from a primary database server to a duplicate database server that is equivalent to the primary database server and configured to execute the transactional database lock commands while applying the one or more data integrity rules. Anomalies indicating a data integrity problem may be detected based on a comparison of the results of the executions at the primary database server and the duplicate database server.

18 Claims, 9 Drawing Sheets

(56) References Cited

U.S. PATENT DOCUMENTS

| | | | |
|---|---|---|---|
| 2012/0136839 A1 | 5/2012 | Eberlein et al. | |
| 2014/0006458 A1 | 1/2014 | Hsieh et al. | |
| 2014/0379658 A1* | 12/2014 | Cheriton | G06F 16/2365 |
| | | | 707/639 |

OTHER PUBLICATIONS

Bernstein et al., "Timestamp-based algorithms for concurrency control in distributed database systems". In Proc. of VLDB, pp. 285-300, 1980.

Markl, V., and Lohman, G., "Learning Table Access Cardinalities with LEO, " Proceedings of the ACM SIGMOD Conference, Madison, Wis., 2002.

Yu et al., "TICTOC: Time Traveling Optimistic Concurrency Control", SIGMOD' 16, Jun. 26-Jul. 1, 2016, San Francisco, CA, URL: http://15721.courses.cs.cmu.edu/spring2016/papers/yu-sigmod2016.pdf, 14 pages.

Jimenez-Peris et al., "Deterministic scheduling for transactional multithreaded replicas". In Proc. of IEEE Int. Symp. on Reliable Distributed Systems, 2000, 13 pages.

"DBMS—Concurrency Control" retrieved from Internet Dec. 12, 2016; URL: http://www.tutorialspoint.com/dbms/dbms_concurrency_control.htm, 7 pages.

Stillger, M., Lohman, G, Markl, V., and Kandil, M., "LEO-DB2's LEarning Optimizer," VLDB Conference 2001, pp. 19-28.

Thomson et al., "The case for determinism in database systems". Proceedings of the VLDB Endlowment, vol. 3, No. 1, 2010, 11 pages.

Thomson et al., "Building Deterministic Transaction Processing Systems without Deterministic Thread Scheduling" (http://cs-www.cs.yale.edu/homes/dna/papers/transactions-wodet11.pdf), retrieved from internet Sep. 30, 2016, 5 pages.

Bernstein et al., "Concurrency control in a system for distributed databases (SDD-1)". ACM Transactions on Database Systems vol. 5, No. 1, Mar. 15, 1980, pp. 18-51.

Bernstein et al., "Concurrency Control and Recovery in Database Systems". Addison-Wesley, 1987.

\* cited by examiner

DETERMINING INTEGRITY OF DATABASE WORKLOAD TRANSACTIONS

BACKGROUND

The present invention relates to the field of database management systems, and more specifically, to evaluating integrity of database workload transactions.

An important function affecting the integrity of a database management system is the deterministic behavior of concurrent database transactions, more specifically table locking, availability and integrity, such as table page read-write accessibility during IUD actions (insert, update or delete). In database systems, locks are employed when more than one database user wants to access data concurrently. Locks are used to maintain data integrity and avoid data corruption when users attempt to modify the same data at the same time.

Standard locking engines allow a database user to modify data upon a granted lock request where exclusive access to the data exists until the lock is disengaged. If the database user needs to lock a database table for which they do not have a lock, they must request a lock from the database management system. Consequently, locking not only provides exclusivity to modify data but also prevents other database users from accessing uncommitted data actions. Normally during a data update, database users request a commit statement to make data modifications permanent. For example, the invocation of a commit to complete a database transaction, such as information read or write actions, makes all associated modifications visible to other users of the database.

Snapshot isolation (SI) is an alternative approach to concurrency control that takes advantage of multiple versions of each data item. A transaction T running under SI sees the database state as produced by all the transactions that committed before T started, but no effects are seen from transactions that overlap with T. This means that SI does not suffer from inconsistent reads. Transaction T will successfully commit only if no updates T has made conflict with any concurrent updates made since T's start. In a database management system (DBMS) using SI for concurrency control, read-only transactions are not delayed because of concurrent update transactions' writes, nor do read-only transactions cause delays in update transactions. Typically, locking is accomplished by a lock manager engine that is included in database management systems where lock acquisition actions are fully synchronized in nature.

However, in database transactional systems, a user may still progress in a transaction without knowing for certain that access to potentially shared data is serialized against modifications by other transactions. This specific anomaly that may occur is known as "write skew."

SUMMARY

According to an aspect of the present invention there is provided a computer-implemented method for evaluating integrity of database workloads carried out at a primary database server capable of receiving transactional database lock commands from concurrent users, the method comprising: identifying a usage pattern of lock actions when results of an execution of the transactional database lock commands match a usage pattern for a data integrity rule; adding the data integrity rule to a set of one or more data integrity rules for the transactional database lock commands; forwarding the transactional database lock commands and the set of one or more data integrity rules to a duplicate database server that is equivalent to the primary database server and configured to execute the transactional database lock commands while applying the set of one or more data integrity rules; and detecting anomalies indicating a data integrity problem based on a comparison of the results of the execution at the primary database server to results from executing the transactional database lock commands at the duplicate database server.

The method may include a method carried out at the duplicate database server, comprising: receiving the transactional database lock commands and the set of one or more data integrity rules from the primary database server; executing the transactional database lock commands whilst enforcing the one or more data integrity rules; and outputting a dataset of the transactional database lock commands for the comparison, wherein the dataset is compared to a dataset of the transactional database lock commands executed by the primary database server.

According to a further aspect of the present invention there is provided a computer-implemented method for evaluating integrity of database workloads, comprising: at an evaluation system, receiving, from a primary database server, a first set of results from execution of a set of transactional database lock commands from concurrent users, wherein the execution of the set of transactional database lock commands identifies a set of one or more data integrity rules; receiving, from a duplicate database server, a second set of results from an execution of the same set of transactional database lock commands carried out while applying the set of one or more data integrity rules, wherein the duplicate database server is synchronized with the primary database server; and comparing the first set of results from the primary database server and the second set of results from the duplicate database server to detect anomalies indicating a data integrity problem.

According to a further aspect of the present invention a database server system is provided for evaluating integrity of database workloads, comprising: a primary database server comprising: a memory configured to store computer program instructions; and a processor configured to receive transactional database lock commands from concurrent users and wherein the computer program instructions cause the processor to: identify a usage pattern of lock actions when results of an execution of the transactional database lock commands match a usage pattern for a data integrity rule; add the data integrity rule to a set of one or more data integrity rules for the transactional database lock commands; forward the transactional database lock commands and the set of one or more data integrity rules to a duplicate database server that is equivalent to the primary database server and configured to execute the transactional database lock commands while applying the set of one or more data integrity rules; and a detect anomalies indicating a data integrity problem based on a comparison of the results from executing the transactional database lock commands at the primary database server with results from executing the transactional database lock commands at the duplicate database server.

The system may include the duplicate database server with schemas and tables that are synchronized to the primary database server which includes: a transaction replicator for receiving the transactional database lock commands and the set of one or more data integrity rules from the primary database server; an integrity function enforcer for executing the transactional database lock commands whilst enforcing the one or more data integrity rules; and an output component for outputting a dataset of the transactional database lock commands for the comparison, wherein the dataset is compared to a dataset of the transactional database lock commands as executed by the primary database server.

According to a further aspect of the present invention the database server system comprises an evaluation system including: a primary receiving component for receiving, from the primary database server, a first set of results from execution of a set of the transactional database lock commands from concurrent users; a secondary receiving component for receiving, from a duplicate database server, a second set of results from an execution of the same set of transactional database lock commands carried out while applying the set of one or more data integrity rules, wherein the duplicate database server is synchronized with the primary database server; and a comparison component for comparing the first set of results from the primary database server and the second set of results from the duplicate database server to detect anomalies indicating a data integrity problem.

According to a further aspect of the present invention there is provided a computer program product for evaluating integrity of database workloads carried out at a primary database server capable of receiving transactional database lock commands from concurrent users, the computer program product comprising a computer readable storage medium having program instructions embodied therewith, the program instructions executable by a processor to cause the processor to: identify a usage pattern of lock actions when results of an execution of the transactional database lock commands match a usage pattern for a data integrity rule; add the data integrity rule to a set of one or more data integrity rules for the transactional database lock commands; forward the transactional database lock commands and the set of one or more data integrity rules to a duplicate database server that is equivalent to the primary database server and configured to execute the transactional database lock commands while applying the set of one or more data integrity rules; and detecting anomalies indicating a data integrity problem based on a comparison of the execution at the results of the primary database server to results from executing the transactional database lock commands at the duplicate database server.

BRIEF DESCRIPTION OF THE DRAWINGS

The subject matter regarded as one or more embodiments of the invention is particularly pointed out and distinctly claimed in the concluding portion of the specification. The invention, both as to organization and method of operation, together with aspects, features, and advantages thereof, may best be understood by reference to the following detailed description when read with the accompanying drawings.

Preferred embodiments of the present invention will now be described, by way of example only, with reference to the following drawings in which.

Figure 1:
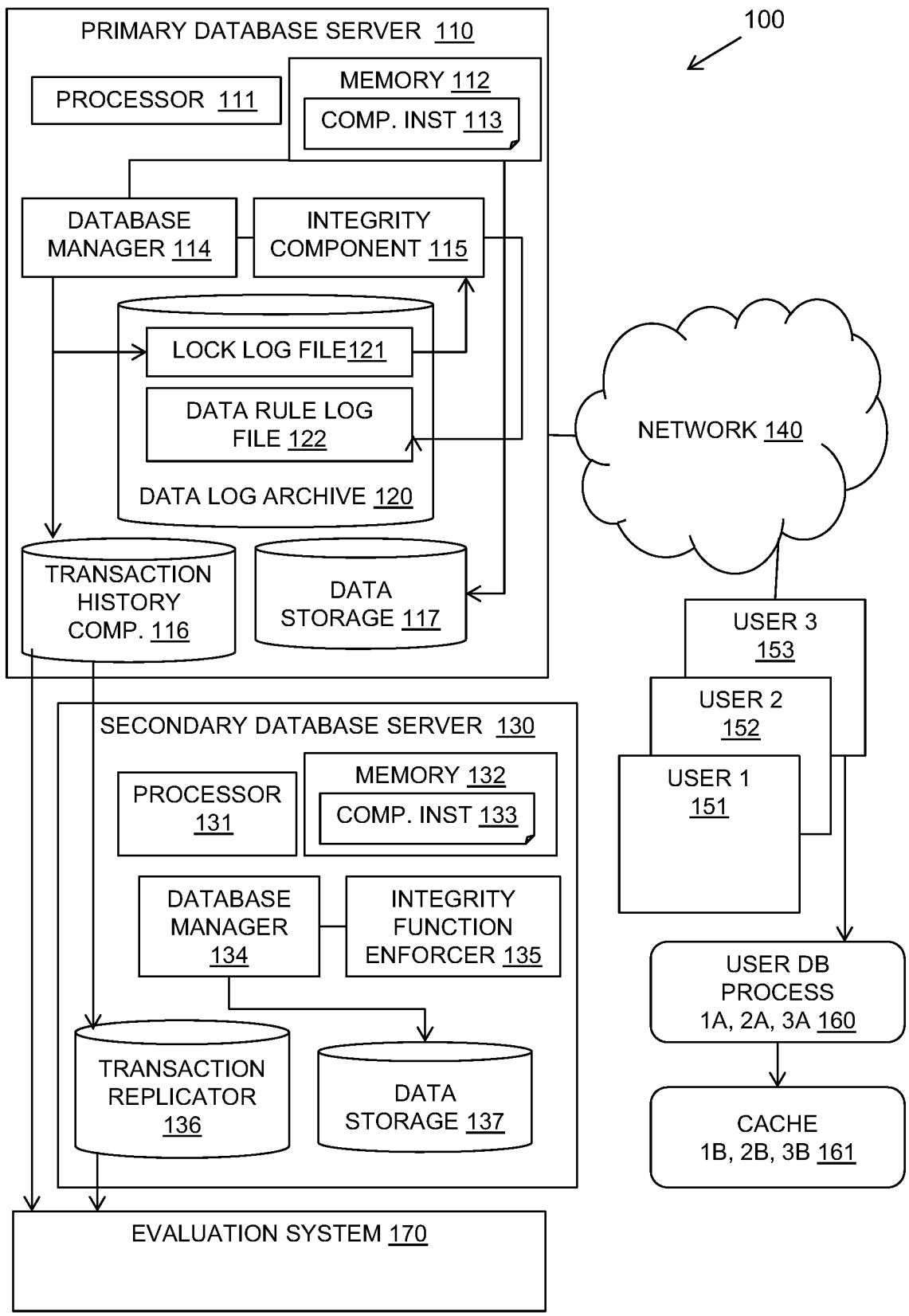
FIG. 1 is block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Systems and methods for evaluating the integrity of database workload transactions by deterministic responsiveness are disclosed.

A critical function influencing the proficiency of a database system is the behavior of transactions, specifically locking transactions. For example, a locking transaction may be a page exchange where a page is a unit of storage within a higher level entity, such as a table space or an index space, and may include one or more rows of a table.

In database systems, locks are utilized when various users seek to get data simultaneously and serve to keep information from being adulterated or corrupted when numerous users try to write to the database. Corrupted information is data that is false and/or in an incomplete state.

In a conventional locking engine, users can modify the information for which they have received a lock, and that gives them selective access to the information until the lock is discharged. At the point when users need to lock a database entity for which they do not presently have a lock, they should request a lock. Henceforth, locking gives selectiveness to data modifications as well as keeps different users from accessing uncommitted modifications. Normally during data modifications, users invoke a commit command to make data modifications permanent. The invocation of a commit command finishes a database transaction, for example, write or read actions executed on the transaction, which roll out all modifications exposed to different users.

Conventionally, locking is administered by lock engines that are incorporated into database management systems and where lock actions are completely synchronized in nature. However, users may progress in a transaction without knowing for certain that access to potentially shared data is serialized against modifications by other transactions of other users. One methodology to address this situation is to secure and discharge locks on an as required premise.

The described methods and systems seek to ascertain deterministic responsiveness of database workload transactions so as to evaluate which information has been adulterated or corrupted when different users attempt to write to the database.

A described system includes a primary database server processing software that analyzes transactional lock commands from several data processing users. The primary database server includes an integrity function for the plurality of data processing users' transactions, which includes a data log archive to determine that a usage pattern associated with a plurality of locks matches a predetermined usage pattern for a data integrity rule. The primary database server processing software instructs a secondary database server processing software to enforce the plurality of data integrity rules and to re-execute the plurality of data processing user transactions. A determination as to which information has been adulterated or corrupted when different users attempt to write to the database is made by comparing data between the primary database server processing software data and the secondary database server processing software data.

Referring to FIG. 1, a system 100 shows an example embodiment of the described system.

A host in the form of a primary database server 110 is a processing device that incorporates database administration and reacts to requests across a network system 140 to provide database management services for access to data storage 117. The data storage 117 shown is integral to the primary database server 110; however, this may be provided remotely and/or as distributed data storage.

The primary database server 110 includes at least one processor 111, a hardware module, or a circuit for executing the functions of the described components which may be software units executing on the at least one processor. Multiple processors running parallel processing threads may be provided enabling parallel processing of some or all of the functions of the components. Memory 112 may be configured to provide computer instructions 113 to the at least one processor 111 to carry out the functionality of the components.

The primary database server 110 includes a database manger 114 providing database management software. The database manager 114 is software that facilitates the definition, creation, querying, updating, and organization of databases and database data. The database manager 114 may oversee data locks. A lock is a manner of serializing a sequence of events or serializing access to information. Locks counteract simultaneous access to database data, which keep the data from being corrupted or adulterated that may result from, for instance, simultaneous writing actions. Any single user can alter data to which they have a lock that gives them absolute access to the data until the lock is discharged. Locking provides exclusivity to writes as well as prevents or controls reading of uncommitted information. A lock may confine access to data instantly when the lock is requested or once the data modifications are updated.

In this embodiment, users 1, 2, 3 (151-153) are processing devices that permit database users to access database data. Users 1, 2, 3 (151-153) incorporate database user processes 1A, 2A, 3A (160) which speak with their correspondent cache 1B, 2B, 3B (161). Database processes 1A, 2A, 3A (160) may speak with one another via a remote direct memory access, a technique that permits direct memory access from the memory of one computing device into that of another without including either device's operating system. Cache 1B, 2B, 3B (161) represents pieces of memory that can straightforwardly store information to enhance the overhauling of future solicitations for that stored information.

In the described system, the primary database server 110 may include an integrity component 115, a data log archive 120, and a transaction history component 116 to provide the described functionality.

The primary database server 110 may be used for data processing user transactions and providing responses during the evaluation of the integrity of the primary database server. The primary database server may continue to process other transactions while the integrity evaluation is being carried out. Alternatively, the primary database server 110 may be provided specifically for testing purposes for evaluating the integrity of transactions.

The database manager 114 provides mechanisms for enforcing business rules and data integrity in the form of constraints and triggers. Integrity rules may be a function of the database system and may be pre-defined; however the integrity rules may be modified to add or remove rules as necessary. Data integrity refers to maintaining and assuring the accuracy and consistency of data over its entire life cycle, and is a critical aspect to the design, implementation and usage of any system that stores, processes, or retrieves data. Data integrity aims to prevent unintentional modifications to information. Any unintended modifications to data as the result of a storage, retrieval or processing action is a failure of data integrity.

The integrity component 115 may use an integrity constraint as a declarative method of defining a rule for a column of a table. A trigger is a special type of stored procedure that automatically takes effect when the data in a specified table is modified (i.e., triggers are stored database procedures automatically invoked on insert, update, or delete actions).

The data log archive 120 may be in correspondence with the integrity component 115 and is a data log archive that incorporates a data rule log file 122 and lock log file 121.

Lock log file 121 may log the lock actions of the user 151-153. The data rule log file 122 may incorporate one or more data integrity rules based on page proprietors when a page they have proprietorship of is no longer legitimate, for example, as a consequence of recent change. The data rule log file 122 may be created by the integrity component 115 and may incorporate data received from a page proprietor that a held page is no longer legitimate. The data rule log file 122 may receive the data integrity rules that should be produced from the illegitimate entities and entity proprietors.

The transaction history component 116 may provide an output from the primary database server 110. The transaction history component 116 may clone the data processing user transactions received from the users 151-153 for sending to secondary database server 130 together with the integrity rules of the data rule log file 122. The transaction history component 116 may also output the result of the data processing user transactions to an evaluation system 170.

A host in the form of a secondary database server 130 is a processing device that incorporates database administration to provide database management services for access to data storage 137. The data storage 137 shown is integral to the secondary database server 130; however, this may be provided remotely and/or as distributed data storage.

The secondary database server 130 includes at least one processor 131, a hardware module, or a circuit for executing the functions of the described components which may be software units executing on the at least one processor. Multiple processors running parallel processing threads may be provided enabling parallel processing of some or all of the functions of the components. Memory 132 may be configured to provide computer instructions 133 to the at least one processor 131 to carry out the functionality of the components.

The secondary database server 130 is a duplicate server of the primary database server 110 with synchronized data storage 137 in order to provide a test control database. The secondary database server 130 is used to apply a plurality of data integrity rules and re-execute a plurality of data processing user transactions.

The secondary database server 130 may incorporate a database manager 134, an integrity function enforcer 135, and a transaction replicator 136.

The integrity function enforcer 135 may be responsible for enforcing the plurality of data integrity rules generated by the integrity component 115 of the primary database server 110 and on a duplicate of the untouched data of the primary database server 110 before any transactions were executed on the primary database server 110.

The transaction replicator 136 may be responsible for re-executing a plurality of data processing user transactions previously executed and cloned on the primary database server 110.

After all transactions are finalized the resultant datasets on both the primary database server 110 and the secondary database server 130 may be output to an evaluation system 170 where they may be analyzed and matched to detect anomalies or corruptions on data. The quality of the transactional system may then be evaluated and, for each anomaly identified, a reverse engineering procedure on the data integrity rule may identify the root cause of a problem. Reverse engineering includes a process that may go through the transaction logs to see which transaction has corrupted the database data in the absence of the integrity rules, therefore allowing corrective action to be taken.

The evaluation system 170 may be provided integral to the primary database server, as a remote service, such as a cloud service or any other architectural platform, such as application containers.

The described systems and methods provide verification that, in conditions where multiple users perform transactions on a database, the transactions have not caused unexpected data corruption "write skew" without impacting the performance of the primary database.

The described method evaluates transactional problems on any transactional model by replicating the transactional workload with selected data integrity rules. Both read-write dependencies and write-write dependencies may be evaluated and the method may determine that both operations would be able to execute simultaneously and commit.

Figure 2:
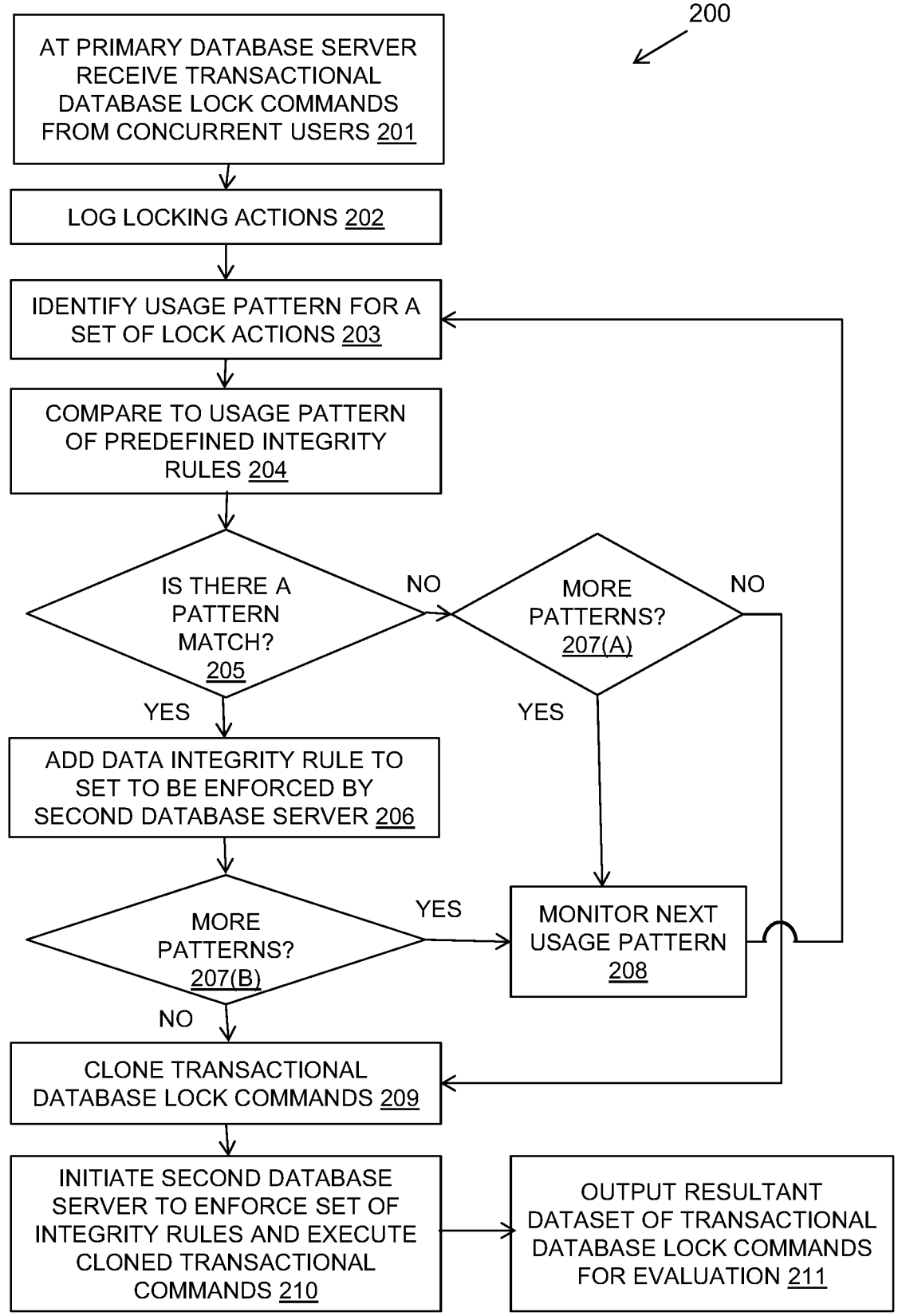
FIG. 2 is a flow diagram of an example embodiment of an aspect of a method in accordance with the present invention.

Referring to FIG. 2, a flow diagram 200 shows an embodiment of the method for evaluating integrity of database workloads carried out at a primary database server 110, for example, as shown in FIG. 1.

The primary database server receives, at step 201, data processing user transactions including transactional database lock commands from a plurality of concurrent users. The primary database server is in communication with a secondary database server that is a duplicate of the primary database server with synchronized data storage.

The primary database server may incorporate database administration to provide database management services to requests from multiple processing devices of database users via a network. The present system provides a testing environment for any work type being executed in the database.

The database management services may include administering locking for users' actions on the database. The described method may log, at step 202, locking actions on the database from the users. The system may log all locking actions, for example, granted locks, requests for locks, refused locked, released locks, etc.

From the logged locking actions, a usage pattern, such as a set of lock actions, may be identified, at step 203, as a result of the received transactional database lock commands and compared, at step 204, to known usage patterns of predefined integrity rules. Further details of this matching process are described in connection with FIG. 5.

It may be determined, at step 205, if there is a substantial pattern match. If there is a substantial pattern match, the data integrity rule associated with the usage pattern may be added, at step 206, to a set of integrity rules to be enforced by the second database server.

If there is no pattern match at step 205 it may be determined, at step 207(A), if there are more patterns for locking actions. Similarly, once an integrity rule has been added to the set at step 206, a determination may be made, at step 207(B), as to whether there are more patterns for locking actions. If more patterns are found at step 207(A) or step 207(B), the method may monitor, at step 208, the next usage pattern and loop to identify a usage pattern, at step 203, to be compared to known usage pattern.

If there are no more patterns for locking actions, the method may proceed to clone the transactional database lock commands for a current workload at step 209. The primary database server may initiate the second database server at step 210 and may forward the transactional database lock commands and the set of one or more data integrity rules. The transactional database lock commands may be automatically incorporated into the commit statement to such a degree that that integrity of the transaction is validated before the commit is executed on the primary database.

Figure 3:
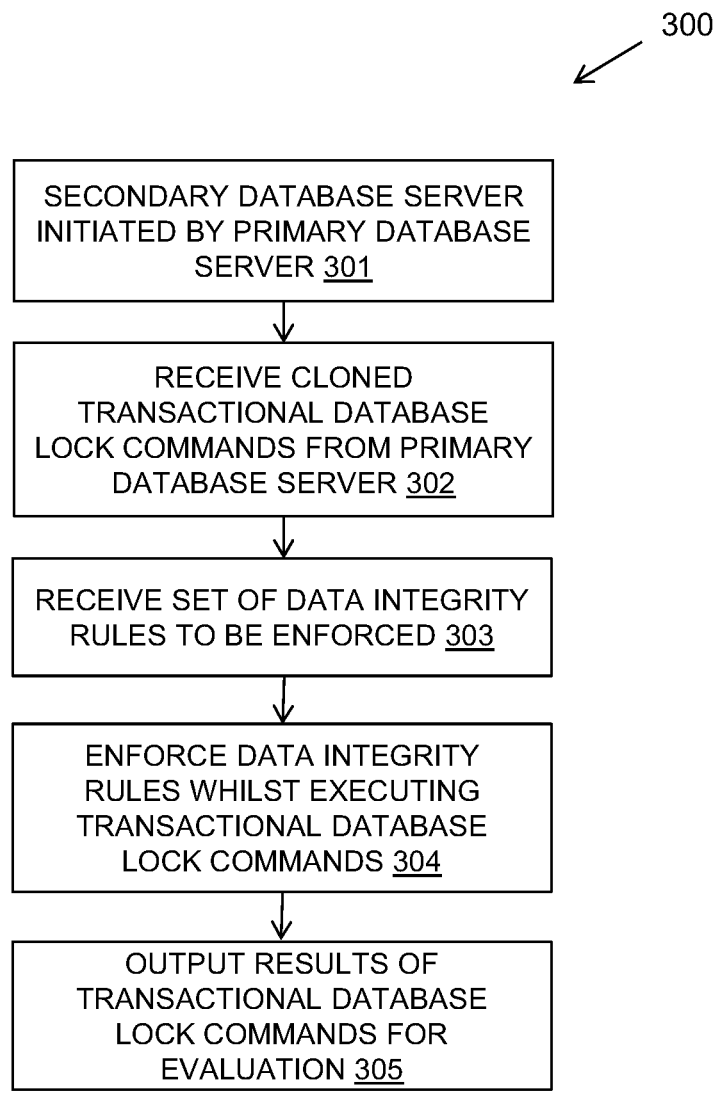
FIG. 3 is a flow diagram of an example embodiment of another aspect of a method in accordance with the present invention.

The second database server may execute the transactional database lock commands while applying the one or more data integrity rules, as is described further in connection with FIG. 3. The primary database server carries out the work of identifying the right data integrity rules for the active workload that are then applied on the secondary database server.

Figure 4:
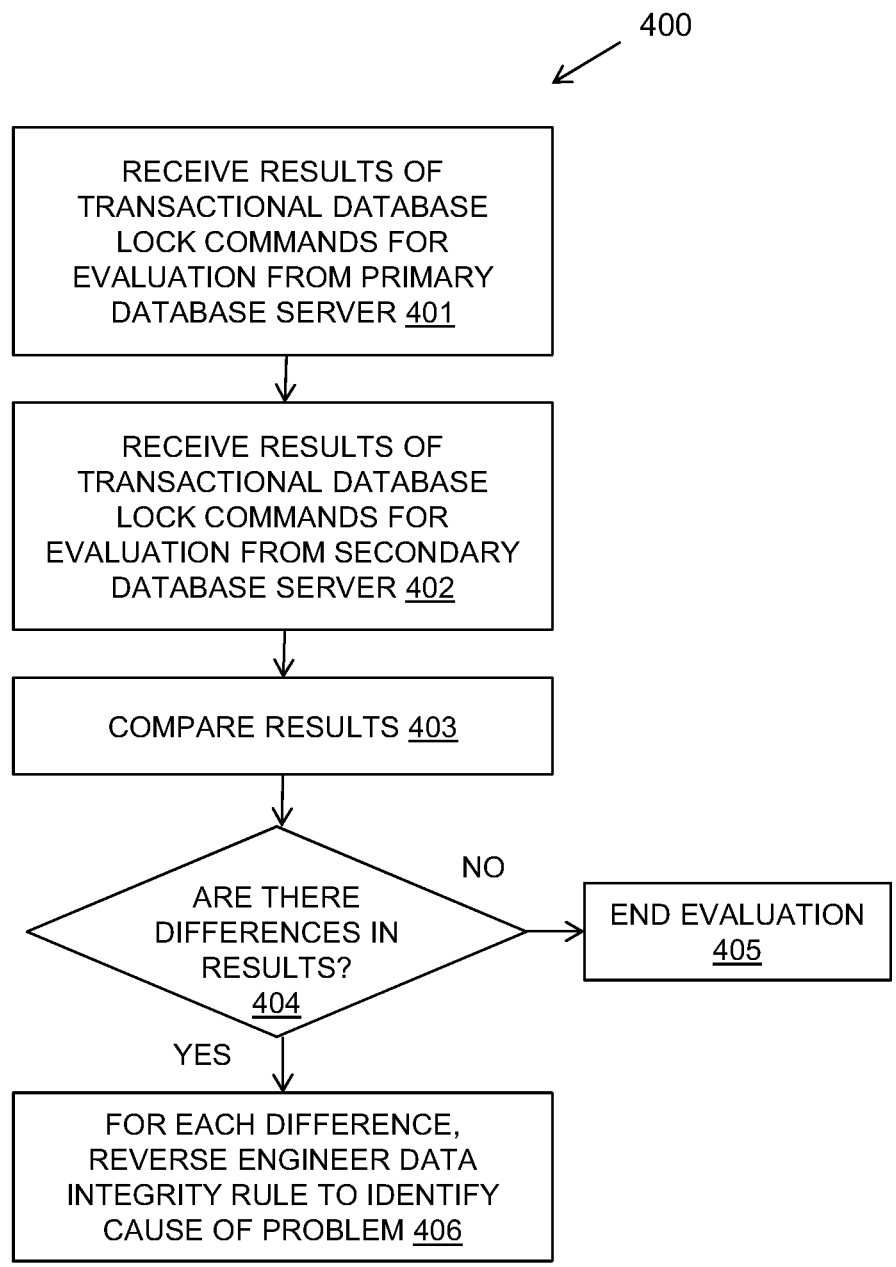
FIG. 4 is a flow diagram of an example embodiment of a further aspect of a method in accordance with the present invention.

The primary database server may output, at step 211, the resultant datasets of the transactional database lock commands to an evaluation system for integrity evaluation as described further in connection with FIG. 4. A comparison of the results of the primary database server and the duplicate secondary database server is evaluated to detect anomalies indicating a data integrity problem.

Referring to FIG. 3, a flow diagram 300 shows an embodiment of the method for evaluating integrity of database workloads carried out at a secondary database server 130, for example, as shown in FIG. 1. The secondary database server is a duplicate of the primary database server with synchronized data storage. The schemas and tables under test in the primary database server are synced up with the secondary database server to ensure that they are the same, and the secondary database server must have an equivalent setup to that of the primary database server.

The secondary database server may be initiated, at step 301, by the primary database server when it is required to carry out a control test for transactional database lock commands. The secondary database server may receive cloned transactional database lock commands from the primary database server at step 302 in the same sequence in which the primary database server received the transactional database lock commands from the users.

The secondary database server may also receive, from the primary database server, the set of data integrity rules that was built during execution of the transactional database lock commands on the primary database server at step 303.

At step 304, the secondary database server may enforce the set of data integrity rules while executing the transactional database lock commands on the data storage of the secondary database server. As mentioned, the secondary database server is a duplicate of the primary database server and is synchronized to the data storage of the primary database server before it executes the same transactional database lock commands.

At step 305, the secondary database server may outputs resultant datasets of the transactional database lock commands to an evaluation system for integrity evaluation, as described further in relation to FIG. 4.

Referring to FIG. 4, a flow diagram 400 shows an embodiment of the method for evaluating integrity of database workloads carried out at an evaluation system. Initially, at steps 401 and 402, the evaluation system receives dataset results from the primary and secondary database servers after they have carried out the same transactional database lock commands (albeit with the secondary database server enforcing data integrity rules).

The dataset results may be compared at step 403 to determine, at step 404, if there are differences in the results. If there are no differences in the results, the evaluation may end at 405 because the enforced data integrity rules did not change the outcome of the primary database server. Put another way, no differences indicates that the data integrity rules were not infringed.

If there are differences in the results, the evaluation system may reverse engineer the data integrity rule that has been infringed for each difference at step 406. This may identify the cause of the difference and, thus, identify the cause of a data integrity problem.

If no data integrity rules are violated (i.e., there is identical behavior between primary and secondary runs), the test may be deemed deterministic. If the secondary database server discovers violations of any data integrity rules, then there is an infringement and the test is deemed non-deterministic, which indicates that the quality of the database system is compromised.

Figure 5:
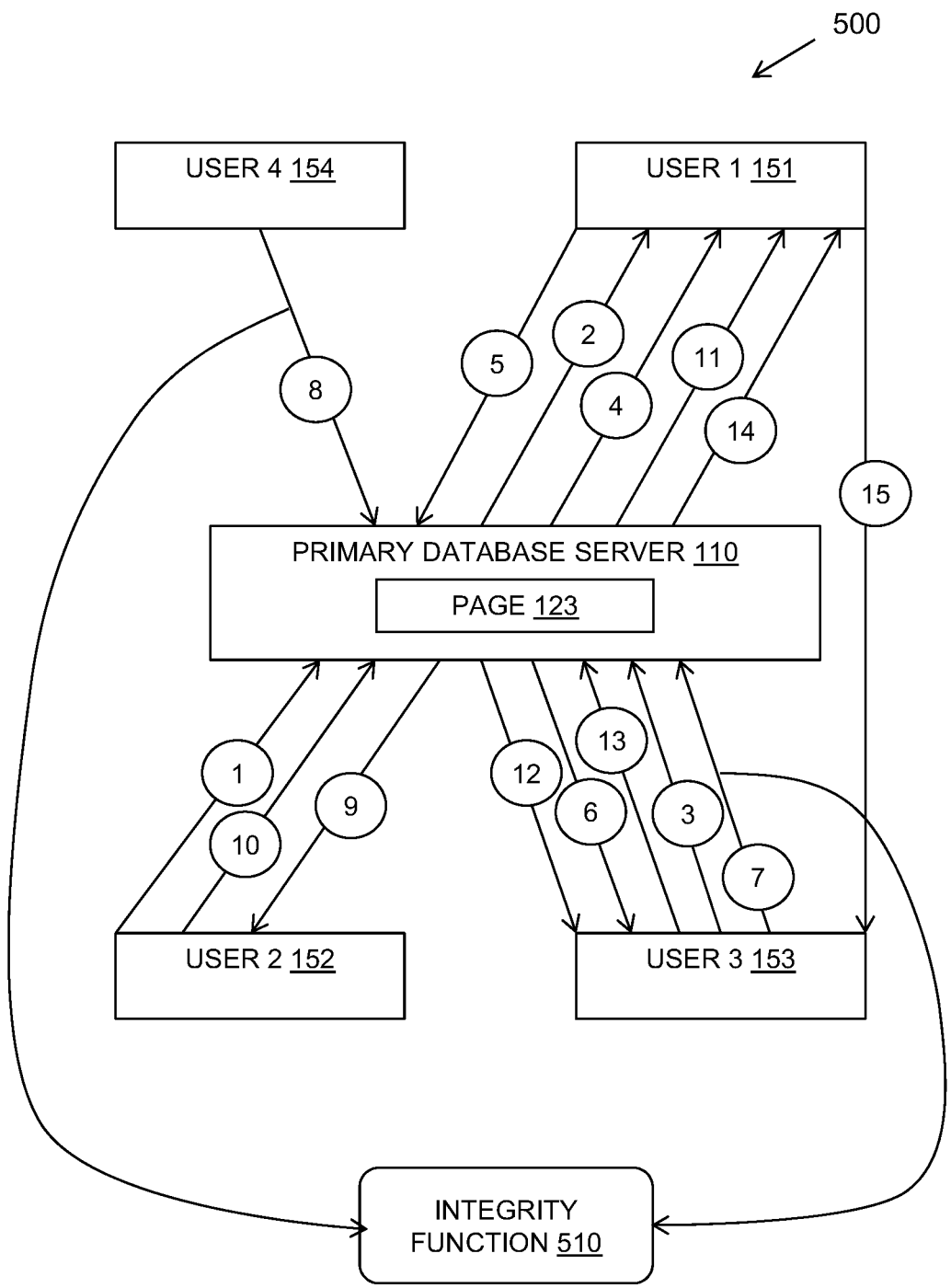
FIG. 5 is a schematic diagram showing lock commands from a plurality of users in accordance with an example embodiment of the present invention.

Referring to FIG. 5, a schematic diagram 500 shows multiple users, Users 1-4 (151-154) and their interactions with the primary database server 110 to illustrate the method of creating data integrity rules. The references of components of FIG. 1 are used.

FIG. 5 illustrates an example of determining a usage pattern associated with a plurality of locks that matches a predetermined usage pattern for a data integrity rule in accordance the described method.

An example page 123 represents financial balance data and User 3 (153) desires to make modifications on page 123, for instance, consistent with the creation of a new customer account. Accordingly, User 3 (153) needs the most recent version of page 123. User 1 (151) is the proprietor of page 123. User 3 (153) has an old version of page 123 saved in cache 3B (shown in FIG. 1) and needs the most recent version.

An integrity function 510 of the integrity component 115 of the primary database server 110 monitors database commit events that occur within the primary database server 110. Subsequent to modifying a version of the page 123 stored in cache 2B (shown in FIG. 1) by User 2 (152), the integrity function 510 detects a request to the primary database server 110 (action 1).

The integrity function 510 validates the appeal command to the page proprietor, User 1 (151), that is associated with page 123 (action 2). For instance, the validation operation detects actions from User 2 (152) that a modification has been made to page 123 and that all other cached versions must be substituted. User 3 (153) sends out a page request for a new version of page 123 to the primary database server 110 (action 3) and the primary database server 110 forwards the request to the page proprietor, User 1 (151) (action 4).

Since both users' actions are executed simultaneously, both transactions would try to create a new account with same account number. Consequently, the integrity function 510 detects the request, queries the database manager 114 as to identity of the proprietor of page 123, and logs the request from the determined proprietor, User 1 (151). In response to receiving the request, User 1 (151) informs the integrity function 510 that User 2 (152) is the proprietor of the actual version of page 123 (action 5).

The primary database server 110 sends out the page proprietorship information to User 3 (153) (action 6), and consistently, the integrity function 510 detects the notification from User 1 (151) that User 2 (152) is the proprietor of the actual version of page 123. User 3 (153) sends out a lock request for page 123 to the primary database server 110 (action 7). For example, database User 4 (154) sends out a lock request to the integrity function 510 for the actual version of page 123 (action 8). The integrity function 510 determines a usage pattern associated with the page proprietorship using the lock association information included in lock log file 121, i.e., when the integrity function 510 detects a simultaneous lock request (action 7 and action 8) evaluates both read-write dependencies and as well no write-write dependencies and it determines that both operations would be able to execute simultaneously and commit (i.e., duplicates are not allowed when a new account is created with same account number).

The integrity function 510 detects a lock reclaim message from the database manager to User 2 (152) instructing it to release the lock on page 123 (action 9), and by doing so, User 2 (152) frees their lock on page 123 and sends it to the primary database server 110 (action 10), which in turn sends page 123 out to User 1 (151) (action 11). The primary database server 110 notifies User 3 (153) that the lock for page 123 is no longer possessed by User 2 (152) (action 12), and User 3 (153) requests for the latest version of page 123 to the primary database server 110 (action 13). In response, the primary database server 110 sends out the request for the latest version of page 123 to User 1 (151) (action 14). User 1 (151) sends out the actual version of page 123 to User 3 (153) (action 15).

Accordingly, the integrity function 510 generates a trigger rule to enforce that only one of the two transactions (actions 7 and 8), by User 4 (154) or by User 3 (153) will be committed by the database. For example, the trigger rule enforces a data integrity rule that duplicates are not allowed for the column account numbers.

A summary of the actions shown in FIG. 5 is given below with the primary database server referred to as the Host:
 Action 1: User 2 sends commit request to Host;
 Action 2: Host forwards commit request to User 1;
 Action 3: User 3 requests new version of page 123 from Host;
 Action 4: Host forwards User 3's request to User 1;
 Action 5: User 1 tells Host that User 2 is now proprietor;
 Action 6: Host tells User 3 that User 2 is currently proprietor;
 Action 7: User 3 sends lock request for page 123;
 Action 8: User 4 sends lock request for page 123;
 Action 9: Host tells User 2 to release the lock;
 Action 10: User 2 releases lock and sends page to Host;
 Action 11: Host sends page back to User 1;
 Action 12: Host tells User 3 that page is not locked;
 Action 13: User 3 requests latest page from Host;
 Action 14: Host requests latest page from User 1;

Action 15: User 1 sends latest page directly to User 3.

This example may be extended to provide an exemplary table and the trigger definition:

```
CREATE TABLE Accounts (AccountNumber INT,
   AccountName VARCHAR(200), Value INT);
CREATE TRIGGER NoDuplicatesOnAccounts
   BEFORE UPDATE ON Accounts
   REFERENCING NEW AS N
   WHEN (n.AccountNumber=(SELECT AccountNumber FROM Accounts WHERE AccountNumber=n.AccountNumber))
   SIGNAL SQLSTATE '98000' SET MESSAGE_TEXT='duplicates are not allowed when a new account is created with same account number').
```

Predefined patterns for a data integrity rules may be based on lock patterns and IUD (insert, update, delete) patterns, and these may be determined by using, for example, analysis provided by learning optimizer products.

An example learning optimizer product is provided by IBM DB2 LEO product (IBM and LEO are trademarks of International Business Machines Corporation), which operates as a query optimizer that is able to compare an estimated performance cost for a query execution plan with an actual performance cost observed when the query is executed. Based on this statistic of a comparison of estimated to actual costs, LEO may modify, if necessary, future cost estimates for similar query execution plans, or recommend the collection of statistics on some database tables.

Figure 6:
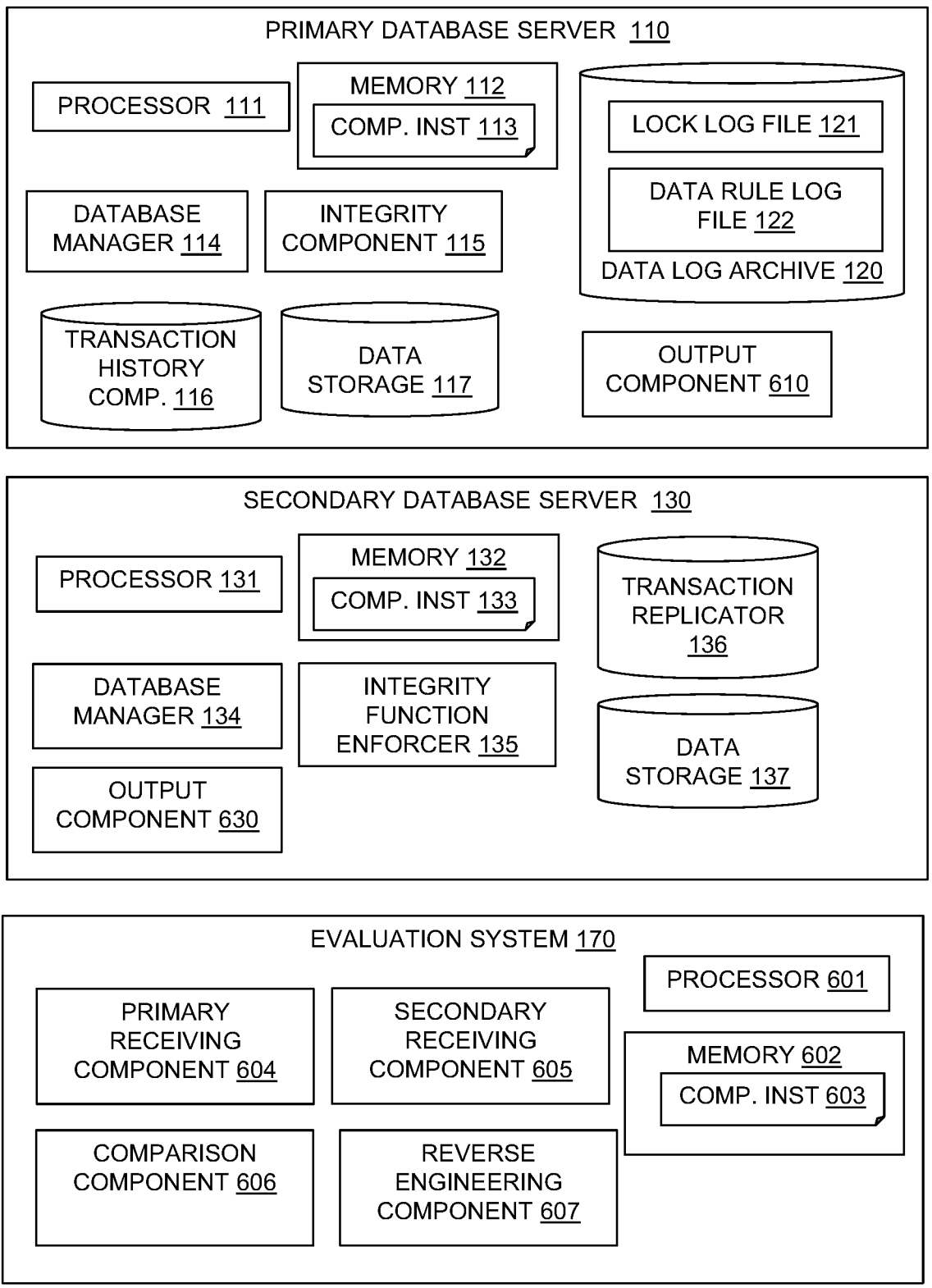
FIG. 6 is a block diagram of an example embodiment of a system in accordance with the present invention.

Referring to FIG. 6, a block diagram shows an example embodiment of the described system 600 including a primary database server 110, a secondary database server 130 and an evaluation system 170 as previously described in relation to FIG. 1. The components shown in FIG. 1 have corresponding reference numbers.

The primary database server 110 includes a processor 111 and memory 112 having computer instructions 113. The primary database server 110 includes data storage 117 and a database manager 114 capable of receiving transactional database lock commands from concurrent users.

The primary database server 110 may include a data log archive 120 including a lock log file 121 for logging user log actions and a data rule log file 122 for identifying a usage pattern of lock actions as a result of the transactional database lock commands matching a usage patter for a data integrity rule.

The primary database server 110 may include an integrity component 115 for adding a matched data integrity rule to a set of one or more data integrity rules for the transactional database lock commands. The integrity component 115 may define data integrity rules by using an integrity constraint as a declarative method of defining a rule for a column of a table or is an automatic trigger when data in a specified table is modified.

The primary database server 110 may include a transaction history component 116 for forwarding the transactional database lock commands and the set of one or more data integrity rules to the secondary database server 130. The transaction history component 116 may duplicate a plurality of transactional database lock commands for forwarding to the secondary database server 130 in the sequence that they were received at the primary database server 110 from the concurrent users. The duplicated plurality of transactional database lock commands may relate to one or more workloads.

The primary database server 110 may include an output component 610 for forwarding the results of the primary database server 110 to the evaluation system 170 for comparison with the results of the secondary database server 130 to detect anomalies indicating a data integrity problem.

The system 600 includes a secondary or duplicate database server 130 which is equivalent to the primary database server 110 and which is used to execute the transactional database lock commands whilst applying the one or more data integrity rules. The secondary database server 130 is provided with schemas and tables synchronized to the primary database server 110.

The secondary database server 130 includes a processor 131 and memory 132 having computer instructions 133. The secondary database server 130 includes data storage 137 and a database manager 134.

The secondary database server 130 may include a transaction replicator 136 for receiving the transactional database lock commands and the set of one or more data integrity rules from the primary database server 110 and an integrity function enforcer 135 for executing the transactional database lock commands whilst enforcing the one or more data integrity rules.

The secondary database server 130 may include an output component 630 for outputting the resultant dataset of the transactional database lock commands to the evaluation system 170 for comparison to the resultant dataset of the transactional database lock commands as executed by the primary database server 110.

The evaluation system 170 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The evaluation system 170 may include a primary receiving component 604 for receiving from the primary database server 110 results of a set of transactional database lock commands from concurrent users.

The evaluation system 170 may include a secondary receiving component 605 for receiving from the secondary database server 130 results of the same set of transactional database lock commands carried out whilst applying the set of one or more data integrity rules.

The evaluation system 170 may include a comparison component 606 comparing the results of the primary database server 110 and the duplicate database server 130 to detect anomalies indicating a data integrity problem. The evaluation system 170 may include a reverse engineering component 607 for determining a data integrity rule which results in the detected anomaly and reverse engineering the data integrity rule to identify a root cause of a problem with the primary database server transaction handling.

Figure 7:
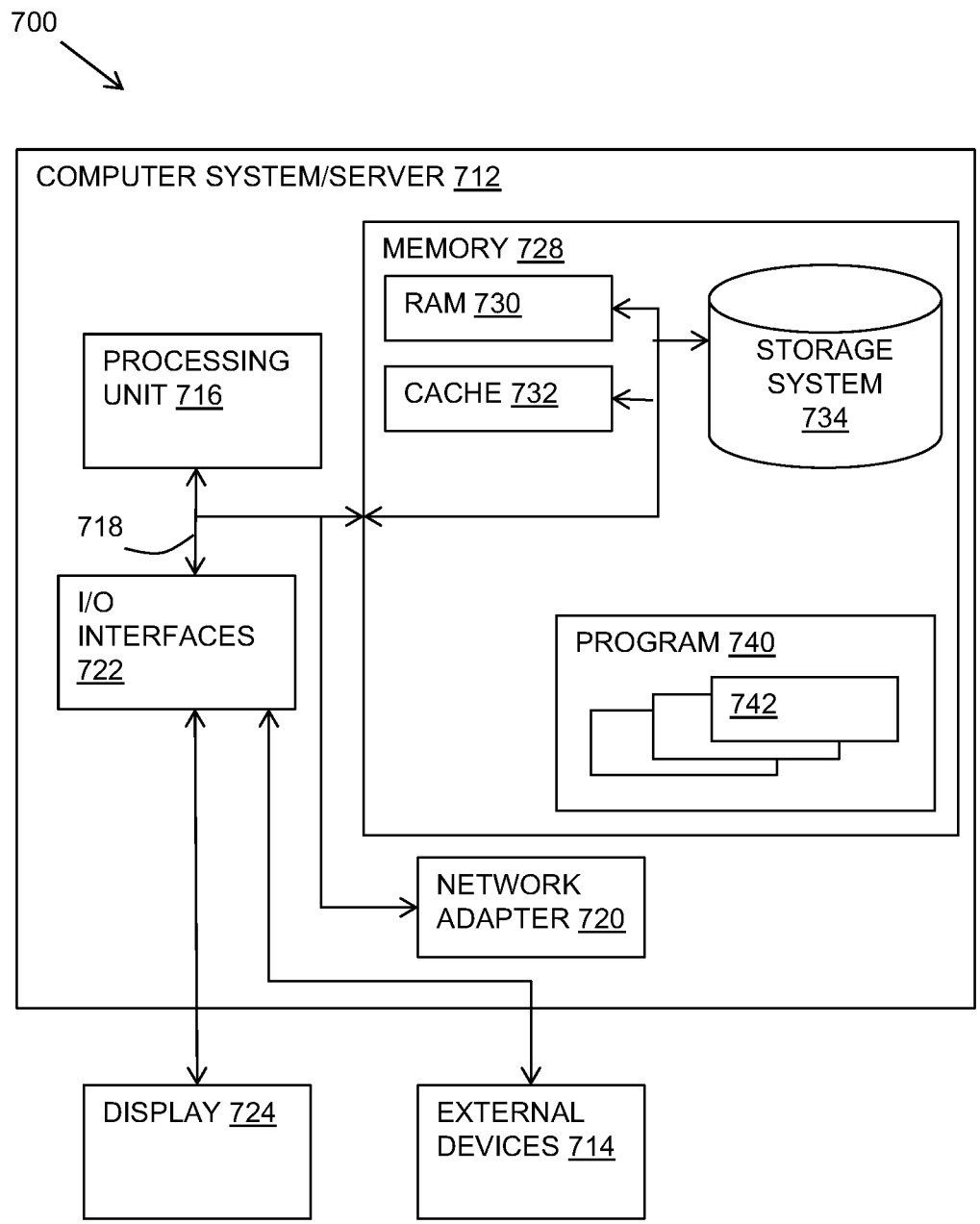
FIG. 7 is a block diagram of an embodiment of a computer system or cloud server in which present invention embodiments may be implemented.

Referring now to FIG. 7, a schematic of an example of a system 700 in the form of a computer system or server is shown.

A computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
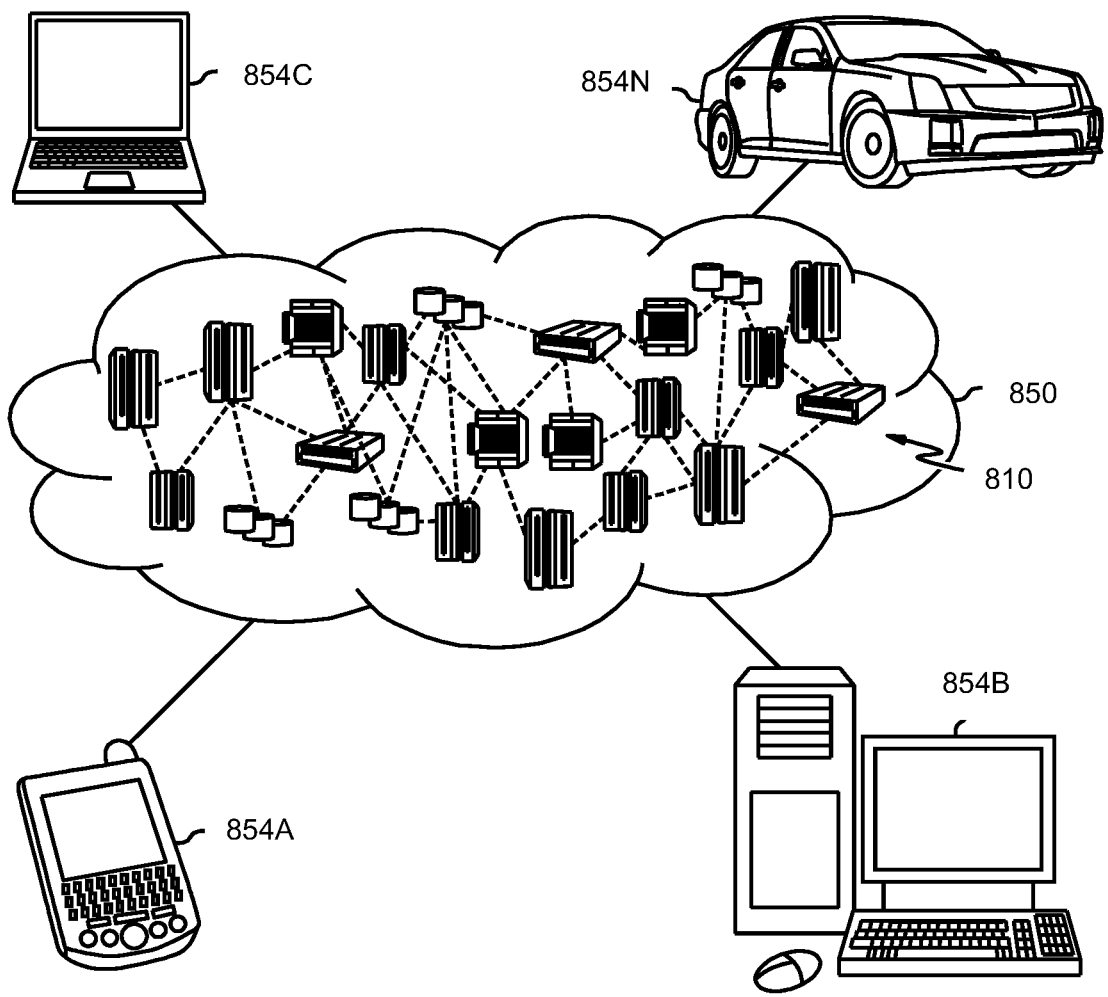
FIG. 8 is a schematic diagram of a cloud computing environment in which present invention embodiments may be implemented.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
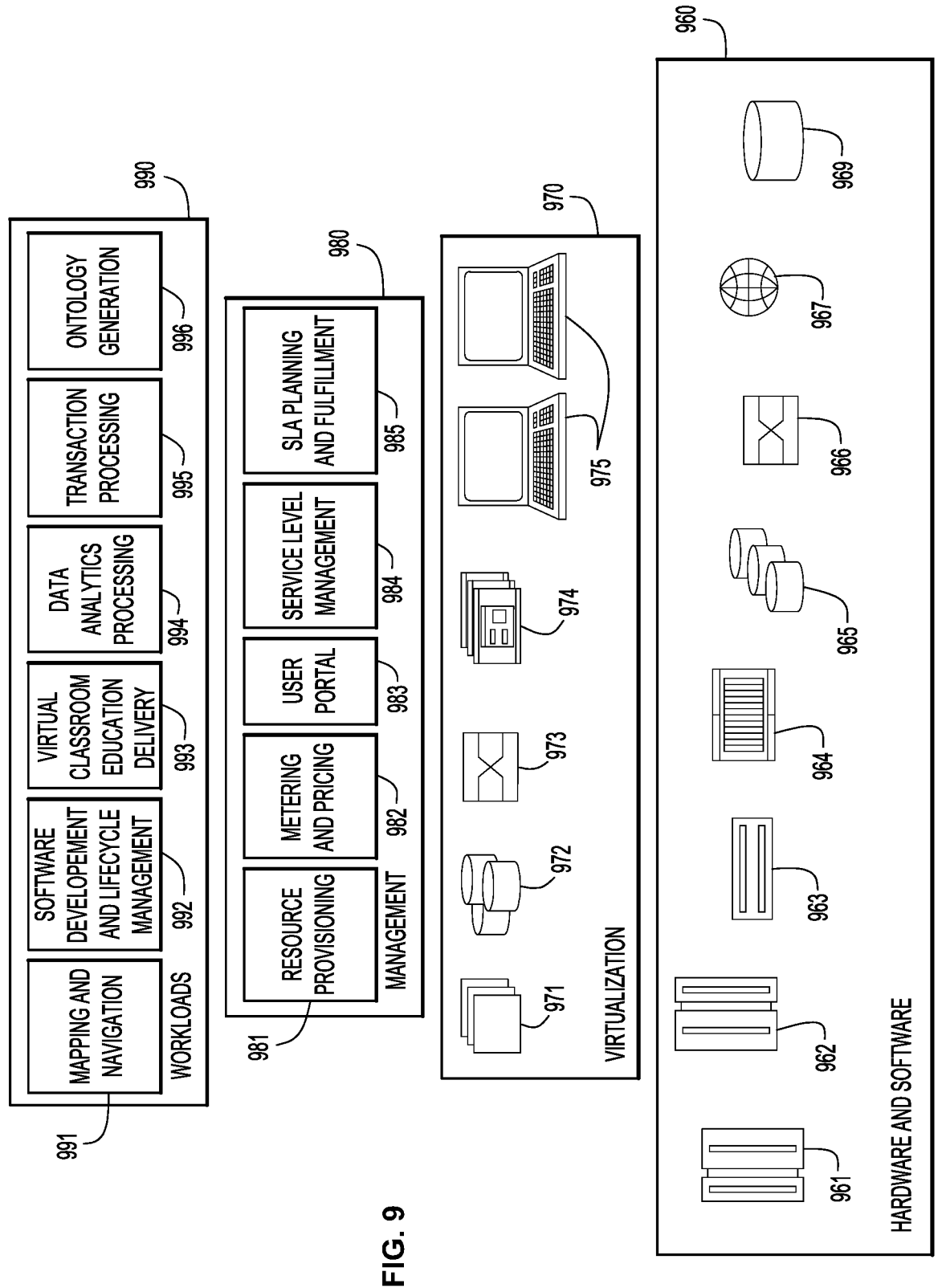
FIG. 9 is a diagram of abstraction model layers of a cloud computing environment in which present invention embodiments may be implemented.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and database testing processing 996.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for determining an integrity of database workloads, comprising:
    at a primary database server receiving transactional database lock commands from concurrent users, identifying a usage pattern of lock actions when results of an execution of the transactional database lock commands match a usage pattern for a data integrity rule;
    adding the data integrity rule to a set of one or more data integrity rules for the transactional database lock commands, wherein the set of one or more data integrity rules provides at least one constraint for data of one or more columns;
    forwarding the transactional database lock commands and the set of one or more data integrity rules to a duplicate database server;
    executing the transactional database lock commands while applying the set of one or more data integrity rules at the duplicate database server to produce results with data satisfying the at least one constraint of the set of one or more data integrity rules; and
    detecting anomalies indicating a data integrity problem based on a comparison of the results of the execution at the primary database server to the results from executing the transactional database lock commands while applying the set of one or more data integrity rules at the duplicate database server.

2. The method of claim 1, further comprising:
    defining the data integrity rule by using an integrity constraint as a declarative method of defining a rule for a column of a table or by using an automatic trigger when data in the table is modified.

3. The method of claim 1, wherein the transactional database lock commands relate to one or more transactional workloads and the method further comprises:
    duplicating the transactional database lock commands for the forwarding to the duplicate database server in a sequence in which the transactional database lock commands were received at the primary database server from the concurrent users.

4. The method of claim 1, further comprising:
    outputting a dataset of the transactional database lock commands identified at the primary database server for the comparison to the results of the duplicate database server, wherein the results of the duplicate database server include a dataset of the transactional database lock commands as executed by the duplicate database server.

5. The method of claim 1, further comprising:
    providing the duplicate database server with schemas and tables that are synchronized to the primary database server.

6. The method of claim 1, wherein the lock actions include one or more from a group of: granted locks, requests for locks, refused locks, and released locks.

7. The method of claim 1, further comprising:
    validating an integrity of the transactional database lock commands by incorporating the transactional database lock commands into a commit statement before the commit statement is executed on the primary database server.

8. The method of claim 1, wherein the one or more data integrity rules apply to both read-write dependencies and write-write dependencies.

9. A computer-implemented method for evaluating integrity of database workloads, comprising:
    at an evaluation system, receiving, from a primary database server, a first set of results from execution of a set of transactional database lock commands from concurrent users, wherein the execution of the set of transactional database lock commands identifies a set of one or more data integrity rules, wherein the set of one or more data integrity rules provides at least one constraint for data of one or more columns;
    receiving, from a duplicate database server, a second set of results from an execution of the same set of transactional database lock commands carried out while applying the set of one or more data integrity rules, wherein the second set of results is produced with data satisfying the at least one constraint of the set of one or more data integrity rules, and wherein the duplicate database server is synchronized with the primary database server; and
    comparing the first set of results from the primary database server and the second set of results from the duplicate database server with the set of one or more data integrity rules applied to detect anomalies indicating a data integrity problem.

10. The method of claim 9, further comprising:
    determining a particular data integrity rule from the set of one or more data integrity rules that caused a detected anomaly; and
    reverse engineering the particular data integrity rule to identify a root cause of a problem with server transaction handling at the primary database.

11. The method of claim 10, wherein reverse engineering further comprises:
    reviewing transaction logs to identify a transaction that has corrupted primary database data in the absence of the one or more data integrity rules.

12. A database system for evaluating integrity of database workloads, comprising:
    a primary database server comprising:
        a memory configured to store computer program instructions; and
        a processor configured to receive transactional database lock commands from concurrent users and, wherein the computer program instructions cause the processor to:
            identify a usage pattern of lock actions when results of an execution of the transactional database lock commands match a usage pattern for a data integrity rule;
            add the data integrity rule to a set of one or more data integrity rules for the transactional database lock commands, wherein the set of one or more data integrity rules provides at least one constraint for data of one or more columns;
            forward the transactional database lock commands and the set of one or more data integrity rules to a duplicate database server that is configured to execute the transactional database lock commands while applying the set of one or more data integrity rules to produce results with data satisfying the at least one constraint of the set of one or more data integrity rules; and
            detect anomalies indicating a data integrity problem based on a comparison of the results from executing the transactional database lock commands at the primary database server with the results from executing the transactional database lock commands while applying the set of one or more data integrity rules at the duplicate database server.

13. The database system of claim 12, wherein the computer program instructions further cause the processor of the primary database server to:
define the data integrity rule by using an integrity constraint as a declarative method of defining a rule for a column of a table or by using an automatic trigger when data in the table is modified.

14. The database system of claim 12, wherein the transactional database lock commands relate to one or more transactional workloads and the computer program instructions further cause the processor of the primary database server to:
duplicate the transactional database lock commands for forwarding to the duplicate database server in a sequence in which the transactional database lock commands were received at the primary database server from the concurrent users.

15. The database system of claim 12, wherein the computer program instructions further cause the processor of the primary database server to:
validate an integrity of the transactional database lock commands by incorporating the transactional database lock commands into a commit statement before the commit statement is executed on the primary database server.

16. The database system of claim 12, wherein the computer program instructions further cause the processor of the primary database server to:
provide the duplicate database server with schemas and tables that are synchronized to the primary database server.

17. The database system of claim 16, wherein the duplicate database server includes:
a transaction replicator for receiving the transactional database lock commands and the set of one or more data integrity rules from the primary database server;
an integrity function enforcer for executing the transactional database lock commands whilst enforcing the one or more data integrity rules; and
an output component for outputting the results of the transactional database lock commands from the integrity function enforcer for the comparison, wherein the results from the integrity function enforcer are compared to the results of the transactional database lock commands executed by the primary database server.

18. The database system of claim 12, further comprising:
a reverse engineering component for:
determining a particular data integrity rule from the set of one or more data integrity rules that caused a detected anomaly; and
reverse engineering the particular data integrity rule to identify a root cause of a problem with transaction handling at the primary database server.

* * * * *